United States Patent
Axbard

[15] 3,644,971
[45] Feb. 29, 1972

[54] METHOD FOR MANUFACTURING ROLLING BEARING COMPONENTS AND COMPONENT MANUFACTURED ACCORDING TO THE METHOD

[72] Inventor: Gunnar Bertil Axbard, Goteborg, Sweden
[73] Assignee: SKF Industrial Trading and Development Co. N.V.
[22] Filed: May 15, 1970
[21] Appl. No.: 37,689

[30] Foreign Application Priority Data

May 16, 1969  Sweden..................................6935/69

[52] U.S. Cl. .........................................29/148.4 C, 113/117
[51] Int. Cl. ..................................................B21d 53/12
[58] Field of Search ...............29/148.4 C; 308/201; 113/117

[56] References Cited

UNITED STATES PATENTS

| | | | |
|---|---|---|---|
| 1,650,852 | 11/1927 | Rouanet | 29/148.4 C |
| 1,967,821 | 7/1934 | Hess | 29/148.4 |
| 2,783,104 | 2/1957 | Anderson | 308/201 |
| 3,313,582 | 4/1967 | Hubbell | 29/148.4 C X |

Primary Examiner—Thomas H. Eager
Attorney—Howson & Howson

[57] ABSTRACT

The method for manufacturing rolling bearing components such as cages and cage portions for deep groove ball bearings or angular contact ball bearings and loose guiding rings for spheric roller bearings by forming the material, which may be sheet metal or wire, to a spring formed unit, cutting a coil of the unit, joining the overlapping ends of the coil by welding, whereupon the joint is pressed to such an extent that the thickness of the material is uniform all around the unit and thereupon giving the unit the final shape in a press.

3 Claims, 1 Drawing Figure

Patented Feb. 29, 1972  3,644,971
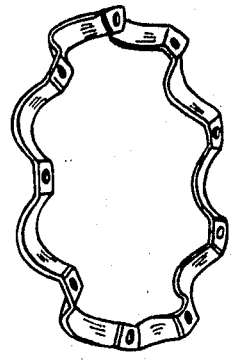
INVENTOR:
GUNNAR BERTIL AXBARD
BY Howson & Howson
ATTYS.

METHOD FOR MANUFACTURING ROLLING BEARING COMPONENTS AND COMPONENT MANUFACTURED ACCORDING TO METHOD

BACKGROUND OF THE INVENTION

The manufacture of cages for deep groove ball bearings and angular contact ball bearings generally is accomplished by blanking annular washers from a plane sheet metal, pressing said washer to provide the desired form, mating it with a similar washer and joining their abutting ends by riveting, welding or any other suitable joining method. The cage thus manufactured is a very useful bearing component but the manufacturing method suffers from the disadvantage of a very great material wastage when the annular washer is blanked from the sheet metal. By method of manufacture according to our invention the saving of material is as large as 80 percent over the previous manufacturing methods.

SUMMARY OF INVENTION

The present invention refers to a method for manufacturing rolling bearing components of the above-mentioned type which will save a very great percentage of material as compared with previous manufacturing methods.

BRIEF DESCRIPTION OF THE DRAWING

The drawing shows a cage half for a single-row deep groove ball bearing manufactured according to the invention.

DESCRIPTION OF THE PREFERRED EMBODIMENTS

The invention will be described in connection to the manufacture of a portion of a cage for a single-row deep groove ball bearing.

The initial material is a metal band preferably sheet metal or wire of a suitable material. In both cases the material is first winded into helical form to obtain a spring-formed unit having a diameter substantially of the size of the finished detail. In the next step a coil of the spring-formed unit is cut off in order to provide a separate circular plane or washer having a round cross section. The washer is then joined at the cut in such a manner that the washer is located in a combined press and welding machine so that the edges of the cut overlap each other preferably as much as the thickness of the material of the washer.

The overlapping ends may then be joined by a suitable welding process whereupon the material at the joint is pressed together so much as the thickness of material at this position will be the same as in other parts of the washer. After this operation the material which has welled out during the pressing and welding of the joint is scrapped off by means of a particular tool in order to get a washer having absolutely smooth end surfaces. By joining ends of the cut by overlapping it is guaranteed that the finished detail will be within desired final tolerances. The washer thereupon is transferred to a press where it is finished to desired form, in the case shown a cage half of the so called "wavy" type for a single-row deep groove ball bearing. Such cage portions then is mated at the bearing assembly and joined by for instance riveting to a complete cage. In using a round wire as the initial material the washer after cutting from the spring unit is given a flat form in a pressing operation whereupon the washer goes through the above-mentioned operations. As mentioned above, the invention is not limited to the manufacture of cage details but can be used in the manufacture of loose guiding rings for spherical roller bearing which on its sides shall have a form, which fits to the roller circular. Another component for which the method may be used is the manufacture of locking rings for particular types of cylindrical roller bearings, which locking rings must have a special final form.

I claim:

1. A method of manufacturing roller bearing components such as cage member consisting of the steps of forming material to a spring-formed unit consisting of a plurality of coils, severing a coil of said unit to form a washerlike member, joining the severed ends of said washerlike member, compressing said member so that it is of uniform cross section and pressing said washer member to form a cage member for a rolling bearing of predetermined configuration.

2. A method as claimed in claim 1 wherein the material is initially in the form of a wire of arcuate cross section and including the step of pressing the wire in an intermediate operation to a flat form.

3. A method as claimed in claim 2 including the step of overlapping the terminal ends of the washerlike member prior to joining the same by welding to form a joint, and thereafter pressing the joint so that the cross-sectional thickness will be approximately the same as the remainder of the washerlike member.

* * * * *